(No Model.)
D. MACKIE.
MACHINE FOR RUBBING OR DRESSING STONE.
No. 398,634. Patented Feb. 26, 1889.
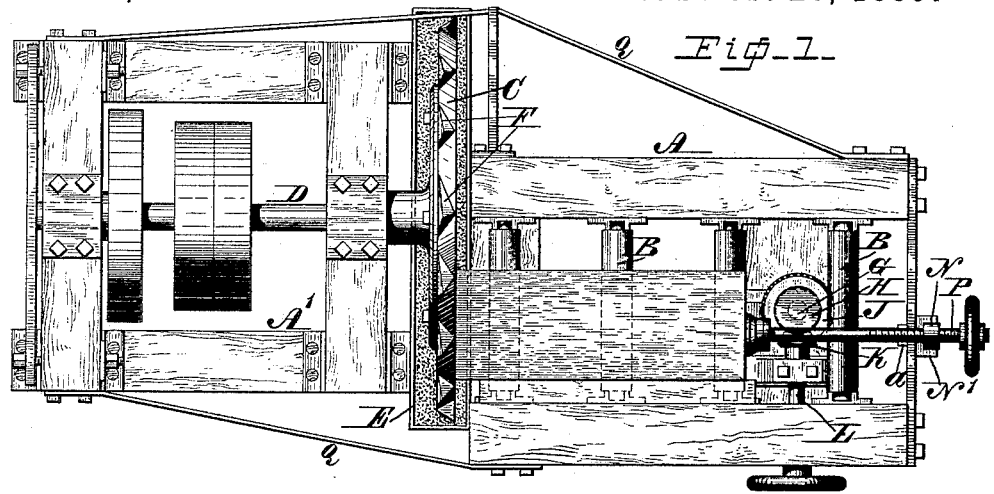
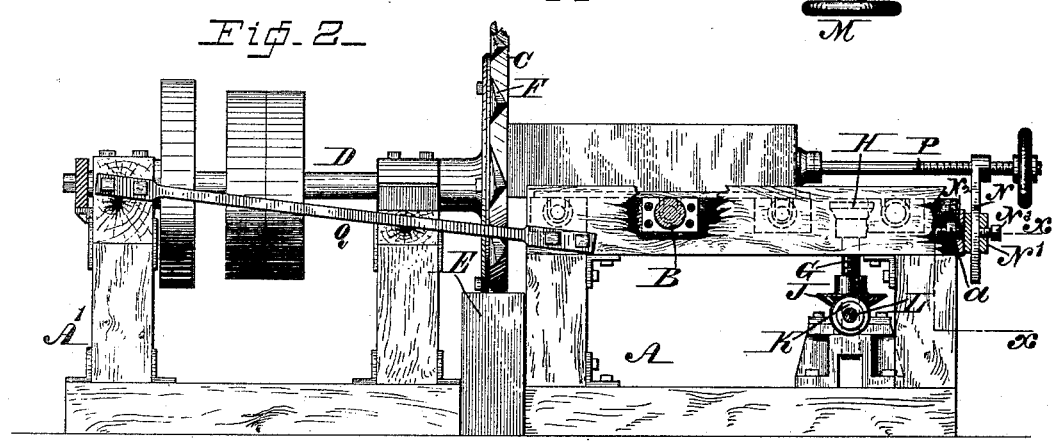
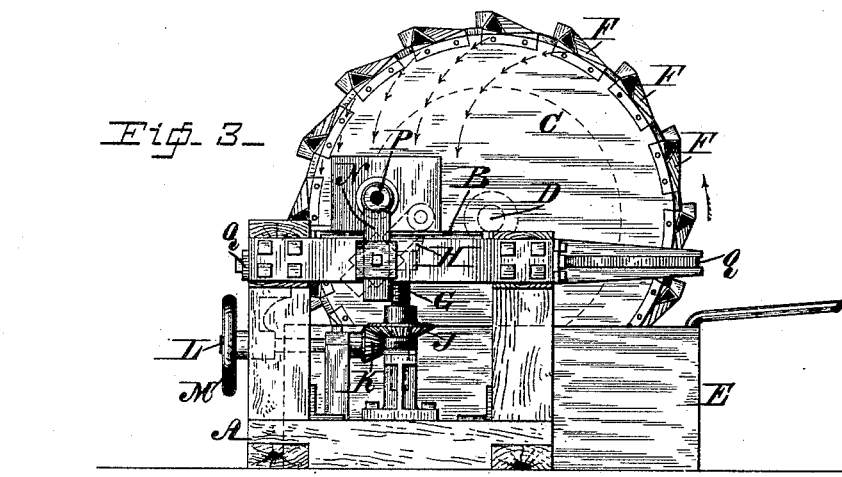
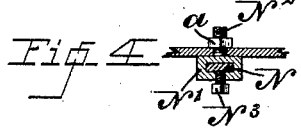
WITNESSES:
James F. Kelly.
L. Douville
INVENTOR:
David Mackie
BY Dudersheim & Kintner
ATTORNEYS.

UNITED STATES PATENT OFFICE.

DAVID MACKIE, OF PHILADELPHIA, PENNSYLVANIA.

MACHINE FOR RUBBING OR DRESSING STONE.

SPECIFICATION forming part of Letters Patent No. 398,634, dated February 26, 1889.

Application filed February 27, 1888. Serial No. 265,383. (No model.)

*To all whom it may concern:*

Be it known that I, DAVID MACKIE, a citizen of the United States, residing in the city and county of Philadelphia, State of Pennsylvania, have invented a new and useful Improvement in Machines for Rubbing or Dressing Stone, which improvement is fully set forth in the following specification and accompanying drawings.

My invention consists of a machine for rubbing or dressing stone having means, as hereinafter set forth and claimed, for supplying the rubbing or dressing disk or head with sand, &c., and water.

It also consists of means, substantially as described, for conveniently reversing the stone.

It also consists of other details, as will be hereinafter fully set forth and claimed.

Figure 1 represents a top or plan view of a machine for rubbing or dressing stone embodying my invention. Fig. 2 represents a side elevation thereof. Fig. 3 represents an end view thereof. Fig. 4 represents a section of a portion on line $x$ $x$, Fig. 2.

Similar letters of reference indicate corresponding parts in the several figures.

Referring to the drawings, A represents the frame of the machine, and B represents rollers mounted on the upper portion and extending horizontally, so as to support the stone to be rubbed or dressed and present the same to the rubbing or grinding disk C, which is secured to a shaft, D, mounted horizontally on the supplemental frame A', said disk thus occupying a vertical position and being located between the frames A A', it being formed of metal, stone, or other suitable material. The shaft D receives power in any suitable manner, and is provided in the present case with fixed and loose pulleys and a fly-wheel, for evident purposes.

To the base of the frame A is secured a box, E, for sand, &c., and water, the same being located below the disk C and being open at the top, so that the peripheral portion of said disk may enter said box and revolve through the same. Connected with the disk at the periphery thereof are the buckets F, the openings of which are so placed that the buckets are filled as they dip into or enter the box E as they rotate with the disk, and empty as they ascend therewith and pass over the center.

Mounted on the frame A is a vertical screw-shaft, G, which has a head, H, swiveled on its upper end after the manner of a lifting-jack, and carries the bevel-wheel J, with which meshes the bevel-pinion K, whose shaft L is mounted horizontally on the frame and provided with a crank handle or wheel, M, which is accessible at the side of said frame.

N represents a vertically-arranged arm movably connected with the end of the frame A opposite to the disk C, and carrying a screw, P, which is so disposed that when rotated it comes into contact with the end of the stone and forces the latter against the disk, so as to hold the same during the rubbing or grinding action of said disk.

The operation is as follows: The screw P is released and stone placed on the rollers B and moved toward the disk C, the screw P then being rotated, so as to fully advance the stone and retain the end of the same in contact with the disk. Power is applied to the shaft D, whereby the disk is rotated, and as the cups or buckets F dip into the sand, water, &c., in the box E they are supplied with such material. As the cups approach the top center, they discharge their load on the side of the disk contiguous to the stone, whereby said material is supplied to the disk and stone for properly accomplishing the rubbing or dressing of the latter. The surplus material reenters the box, so that it may be reused. When one end or side of the stone is finished, the screw P is released, after which the stone is run back until it is centrally over the head H of the jack or screw-shaft G. The wheel M is now rotated, whereby the shaft rises and the stone is raised clear of the rollers B. The stone is then turned or reversed on the head H, so that the unfinished end or side of the same may be presented to the disk. The wheel M is again rotated, so that the stone is lowered, and as it again rests on the rollers it is pushed toward the disk, after which the screw P is operated, whereby the stone is fully advanced to the disk and held during the subsequent rubbing or dressing action thereof. The arm N may be raised and lowered and turned laterally, so as to adjust the screw P to the height and width of the stone and permit the stone to be reversed without interference of said screw. For this purpose said arm is freely fitted in a box, N', which is swiveled to the end piece of the frame A by means of a bolt, N², which is secured to said box and passes through said end piece, its threaded end having a nut, $a$, which is adapted to tighten against said piece. The box carries a screw or bolt, N³, which is adapted to tighten against the arm N and hold the same in adjusted positions. When the bolt N³ is loosened, the arm may be raised or lowered. When the nut $a$ is loosened, the box may be rotated so as to turn the arm to the right or left, as the case may be. (See dotted lines, Fig. 3.)

The frames A A' have connected with them the braces Q, whereby they are enabled to endure the strain due to the thrust of the stone against the disk.

Having thus described my invention, what I claim as new, and desire to secure by Letters Patent, is—

1. The stone rubbing or dressing disk having cups or buckets connected with the periphery of the same and adapted to empty or discharge their contents over the rubbing side thereof, substantially as described.

2. A stone rubbing or dressing disk having cups or buckets connected with the periphery thereof, in combination with a feeding-box into which said buckets dip and are filled as the disk rotates, substantially as described.

3. In a stone rubbing or dressing machine, a frame, a screw for holding the stone against a rubbing or dressing disk, and an arm supporting said screw adjustably connected with the frame, substantially as described.

4. A stone rubbing or dressing machine having a disk, a frame with rollers thereon, a box swiveled to said frame, an arm secured in said box, and a screw working in said arm, said parts being combined substantially as described.

5. A stone rubbing or dressing machine having a rubbing-disk, a frame with rollers journaled therein, an arm secured to said frame, a screw working in said arm, and a lifting-screw with mechanism, substantially as described, for operating the same, said parts being combined substantially as described.

DAVID MACKIE.

Witnesses:
H. C. SHURTLEFF,
JAMES KENT.